United States Patent [19]

Odell et al.

[11] Patent Number: 4,921,940

[45] Date of Patent: May 1, 1990

[54] PROCESS FOR THE PURIFICATION OF TI CONTAINING POLYCARBONATE WITH SOLVENT, COMPLEXING AGENT AND WATER

[75] Inventors: Peter G. Odell; Giuseppa Baranyi, both of Mississauga; Lupu Alexandru, Toronto, all of Canada

[73] Assignee: Xerox Corporation, Stamford, Conn.

[21] Appl. No.: 232,089

[22] Filed: Aug. 15, 1988

[51] Int. Cl.⁵ ............................................. C08G 63/62
[52] U.S. Cl. .................................... 528/486; 430/56; 430/70; 528/196; 528/492; 528/495
[58] Field of Search ............... 528/486, 196, 492, 495

[56] References Cited

U.S. PATENT DOCUMENTS

| | | | |
|---|---|---|---|
| 1,760,758 | 5/1930 | Korten | 568/728 |
| 1,977,627 | 10/1934 | Greenhalgh | 260/64 |
| 2,069,560 | 2/1937 | Rothrock | 260/154 |
| 2,069,573 | 2/1937 | Bolton | 260/154 |
| 2,762,846 | 9/1956 | Reiner et al. | 260/619 |
| 2,858,342 | 10/1958 | Bender | 260/619 |
| 2,923,744 | 2/1960 | Scriabine et al. | 260/619 |
| 3,012,022 | 12/1961 | Reed et al. | 260/93.7 |
| 3,492,268 | 1/1970 | Baker | 260/47 |
| 3,838,102 | 4/1974 | Bennett et al. | 260/47 ET |
| 3,943,101 | 3/1976 | Vestergaard et al. | 260/45.85 R |
| 4,304,899 | 12/1981 | Mark et al. | 528/171 |
| 4,377,684 | 3/1983 | Bolon et al. | 528/486 |
| 4,383,092 | 5/1983 | Ko et al. | 526/62 |
| 4,423,252 | 12/1983 | Maki et al. | 568/728 |

*Primary Examiner*—Harold D. Anderson
*Attorney, Agent, or Firm*—E. O. Palallo

[57] ABSTRACT

A process for the purification of polycarbonates or copolymers thereof containing titanium catalyst residues, which comprises mixing a polycarbonate or copolymers thereof with a solvent; adding to the formed solution mixture a complexing component; admixing the resulting mixture with water; and subsequently separating the polycarbonate or copolymer product therefrom.

21 Claims, No Drawings

PROCESS FOR THE PURIFICATION OF TI CONTAINING POLYCARBONATE WITH SOLVENT, COMPLEXING AGENT AND WATER

BACKGROUND OF THE INVENTION

This invention is generally directed to processes for the preparation of polycarbonates, inclusive of those obtained from biphenols such as gem-bis(hydroxyaryl)alkanes, reference U.S. Pat No. 4,766,255, entitled Processes for Bisphenols, the disclosure of which is totally incorporated herein by reference. More specifically, the present invention relates to processes for the purification of polycarbonates, especially polycarbonate (A), polycarbonate (Z), copolymers thereof, and the like, wherein undesirable impurities such as catalysts selected for the preparation thereof are removed. In one embodiment of the present invention there is provided a process for the purification of polycarbonates obtained from, for example, the known melt polyesterification reactions, which process comprises the formation of a complex with a titanium catalyst, and the removal thereof enabling polycarbonates with improved characteristics. Accordingly, with the process of the present invention there are obtained polycarbonates substantially free of titanium butoxide catalysts, which catalysts are selected in some instances for the preparation of polycarbonates. The purified polycarbonates obtained with the process of the present invention possess improved characteristics, including low dark decay values, and minimum residual potential with cycle up when these polycarbonates are selected as binders for transport molecules in layered imaging members as illustrated, for example, in U.S. Pat. No. 4,265,990, the disclosure of which is totally incorporated herein by reference. Also, with the purified polycarbonates of the present invention the undesirable crystallization of aryl amine molecules, which are dispersed therein for the formation of the aforementioned imaging members, is eliminated. Additionally, the toxic chemical phosgene is avoided with the process of the present invention. Also, with the process of the present invention there can be obtained purified polycarbonates of a weight average molecular weight of from about 25,000 to about 100,000, and preferably from about 26,000 to about 55,000. These molecular weights result, it is believed, since the more active catalysts comprised of titanium or zirconium alkoxides are initially selected for the preparation of the polycarbonate, which is then purified in accordance with the process of the present invention. When less active manganese acetate is selected for the preparation of polycarbonates, the weight average molecular weight of the polycarbonates obtained is lower, that is less than about 20,000 and about 16,000. The higher molecular weight polycarbonates of about 25,000 to about 100,000 possess increased toughness, and provide for a longer lasting and more resilient device when employed as the resin binder in layered imaging members.

Processes for the preparation of bisphenols are known, and generally involve the condensation of two mole equivalents of phenol with one more equivalent of carbonyl compound in the presence of an acid catalyst. Acid catalysts employed for the aforementioned condensation are concentrated hydrochloric acid, gaseous hydrogen chloride, concentrated sulfuric acid, hydrogen fluoride, hydrogen bromide, boron trifluoride, boric acid, ferric chloride, phosphorus chloride, phosphorus pentoxide, benzenesulfonic acid, and the like. Although these acid catalysts, in particular gaseous hydrogen chloride, are very effective in promoting the condensation of phenols with sterically accessible ketones such as acetone, they are not effective for the preparation of bisphenols, especially bisphenol (Z) derived from the sterically demanding small cyclic ketone such as cyclopentanone or cyclohexanone. The condensation with small ring ketones does not normally proceed in a rapid manner, and the yield of product is generally less than desirable. The aforementioned reaction, especially when accomplished in the presence of hydrogen chloride as a catalyst, is illustrated in U.S. Pat. No. 4,304,899. Similar teachings are presented in U.S. Pat. Nos. 1,760,758; 2,069,560 and 2,069,573, wherein there are disclosed methods for the preparation of bisphenols with hydrogen chloride catalysts. The polycarbonates resulting from these bisphenols can be selected as resinous binders for aryl amine hole transport compounds.

In U.S. Pat. No. 2,858,342, there is disclosed, for example, a method for the preparation of bisphenols utilizing alkali metal phenoxides, or alkaline earth metal phenoxides of the phenol being reacted; and wherein cyclohexanone may be selected as a reactant. There resulted in one process embodiment illustrated in this patent, reference Example XI, the preparation of 1,1-bis-(4-hydroxyphenyl)cyclohexane. Also, there is described in U.S. Pat. No. 4,423,352 a process for the preparation of bisphenols utilizing a cation exchange resin modified with a pyridine alkanethiol as a catalyst.

Moreover, U.S. Pat. No. 1,977,627 describes a process for the preparation of bisphenols wherein 65 to 75 percent sulfuric acid is selected as the catalyst. With the process as disclosed in the '627 patent, there is avoided a complex apparatus, and moreover corrosion problems are substantially reduced. In comparison to the processes mentioned herein, wherein, for example, hydrogen chloride is selected as a catalyst, the process of the '627 patent proceeds in a less rapid manner and the product resulting is more difficult to purify. Additionally, it is known that certain sulfur compounds such as sulfur dichloride, sodium thiosulfate, sodium sulfide and the like can be selected for the synthesis of bisphenols, reference for example U.S. Pat. No. 2,923,744, which illustrates a process for the preparation of bisphenols wherein there is selected mercaptoalkanesulfonic acids in catalytic amounts for the purpose of promoting the condensation of phenols and carbonyl compounds. Similarly, selenium and tellurium compounds are effective catalysts for bisphenol synthesis, reference for example U.S. Pat. No. 2,762,846.

Furthermore, in the aforesaid U.S. Pat. No. 4,766,255 there is illustrated the preparation of bisphenols, which comprises the reaction of ketones and phenols in the presence of halotrialkylsilanes and a thiol catalyst. In one specific embodiment of the copending application, bisphenols are obtained by reacting ketones with an excess of phenols in the presence of a stoichiometric quantity of chlorotrimethyl silane and a catalytic amount of, for example, an alkanethiol.

Accordingly, in one embodiment of the aforementioned copending application there is illustrated the preparation of polycarbonates from bisphenol (Z), which is formed by the reaction of cyclohexane, and an excess amount of phenol in the presence of a stoichiometric quantity of chlorotrimethyl silane and a catalytic amount of butanethiol, which reaction is acomplished at at temperature of from about 30° to about 65° C. and is illustrated with reference to the following illustrative reaction scheme

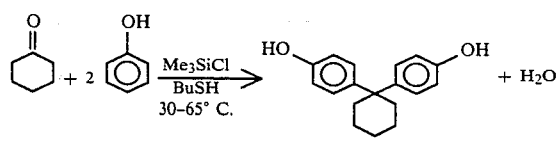

Illustrative examples of ketones usually selected in one mole equivalent that may be utilized for the aforementioned process include acetones, butanones, pentanones, cyclopentanones, substituted cyclopentanones, cyclohexanones, substituted cyclohexanones, and the like. As hydroxyarenes, such as phenols, present in an amount of from about 2 to 10 mole equivalents, there can be selected for this process of the present invention phenols, cresols, ethylphenols, halophenols, cyanophenols, nitrophenols, naphthols, and the like. Examples of alkylhalosilanes present in an amount of from about 0.1 to 3 mole equivalents that can be selected for this process include chlorotrimethyl silane, dichlorodimethyl silane, methyltrichloro silane, bromotrimethyl silane, fluorotrimethyl silane, chlorotriethyl silane, bromotriethyl silane, fluorotriethyl silane, and other similar silanes wherein the alkyl substituent contains, for example, from 1 to about 10 carbon atoms; and the halogen substituent can be fluoro, chloro, bromo, or iodo.

The bisphenols obtained with the processes of the aforesaid copending application can be selected for the preparation of resin binder polycarbonates by the reaction thereof with carbonate precursors such as phosgene, diacyl halides, bishaloformates, diesters, and diarylcarbonates. Polycondensation of bisphenols with phosgene, diacyl halide and bishaloformate can be executed in a suitable medium such as methylene chloride in the presence of a base such as pyridine. Also, the polycondensation reaction can also be conveniently accomplished by interfacial polymerization. The polycondensation of a bisphenol with a diester or diarylcarbonate requires an efficient catalyst such as titanium alkoxides, high temperatures, and high vacuum with an efficient condenser to remove the displacement byproduct. More specifically, polycarbonates such as PC(A) and PC(Z), for instance, are respectively prepared by reacting at room temperature stoichiometric quantities of bisphenol (A) and bisphenol (Z) with phosgene in methylene chloride in the presence of pyridine. These polycarbonates can also be prepared by interfacial polymerization of bisphenols with phosgene in a water methylene chloride medium containing a suitable water soluble base. Further, the aforementioned polycarbonates can be synthesized by transesterification with diphenylcarbonates in the presence of a catalyst such as titanium isopropoxide at high temperatures under high vacuum conditions. In the latter process, an efficient stirring mechanism and a condensing system to remove the phenol byproduct during the course of the polymerization can be utilized.

Polycarbonates with a weight average molecular weight, Mw, of from about 20,000 to about 200,000, and preferably from about 25,000 to about 100,000 prepared from the aforementioned bisphenol are useful as resinous binders for photogenerating pigments and charge transport molecules in layered photoresponsive imaging members as illustrated, for example, in U.S. Pat. No. 4,265,990, the disclosure of which is totally incorporated herein by reference. More specifically, these members are usually comprised of a supporting substrate, a photogenerating layer containing there from about 85 to about 99 percent by weight of trigonal selenium, metal phthalocyanines, or metal free phthalocyanines, dispersed in the polycarbonate resinous binder present in an amount of from about 1 to about 15 percent by weight; and a charge transport layer comprised of, for example, aryl amines of the formula as illustrated in the '990 patent, and copending application U.S. Ser. No. 851,051 (now abandoned) relating to organic photoconductive imaging members, the disclosure of which is totally incorporated herein by reference. The aforementioned photoconductive imaging members can be incorporated into numerous imaging and printing processes and apparatuses inclusive of xerographic imaging methods.

Kosji Ueno and S. Hasegawa, Japanese Patent Application 1971-61,342, disclose a process for the preparation of polycarbonate Z products using metallic acetates, principally manganese acetates. Although these products have acceptable xerographic properties following precipitation from toluene into methanol, manganese acetate catalyzed polymerizations do not enable high molecular weight polymers as indicated herein. With high molecular weight polycarbonates, from about 25,000 to about 100,000 as indicated herein, there is provided a tougher material for the photoreceptor. Also, numerous processes are known for deactivating titanium alkonate catalyst. While these processes inhibit the catalytic action of the titanium compounds selected, they do not eliminate the deleterious influence of the catalyst residue on the xerographic performance of the polymer.

There is disclosed in U.S. Pat. No. 3,483,157 processes utilizing arsenic compounds or steam. Specifically, the processes illustrated in the '157 patent were designed for catalyst deactivation so that further processing steps do not trigger additional polymerization, particularly in the blending steps hence they are catalyst "poisons" and are not removed from the polymer since, for example, the catalyst is not soluble in water. Also, arsenic compounds are extremely toxic. Moreover, in French 2,343,778 (1977) and Miller German Offen. DE 2506353, 1975 there is disclosed phosphorus complexation for the purpose of catalyst deactivation, however, both of these methods retain molecular species in the polymer that will negatively affect its xerographic performance. The fiber industry's practice of treating titanium catalyzed polymer with aqueous base produces a colorless polymer, however, the now colorless titanium residue imparts poor xerographic performance to the polymer.

Accordingly, while processes for the preparation of polycarbonates are known, there is a need for processes for the purification thereof. More specifically, there is a need for processes that will enable the removal of undesirable impurities from the polycarbonates obtained. Additionally, there is a need for purification polycarbonate processes wherein titanium catalysts are removed thereby permitting layered imaging members containing the polycarbonates to possess improved electrical characteristics, including low dark decay values. Furthermore, there is a need for processes for the purification of polycarbonates, which are substantially free of titanium impurities, enabling their use, for example, as binders in electrophotographic imaging members, and wherein the charge transport molecules selected are substantially free of crystallization. In addition, there is a need for economical processes that enable the purification of polycarbonates wherein titanium catalysts selected for the preparation thereof are substantially removed. Also, there is a need for efficient processes that permit the purification of polycarbonates that employ reagents of low or no flammability. There is also a need for processes that produce colorless polymers from titanium catalyzed polymerizations.

SUMMARY OF THE INVENTION

It is therefore an object of the present invention to provide processes for the purification of polycarbonates.

A further object of the present invention is the provision of an economical process for the purification of polycarbonates.

Additionally, in a further object of the present invention there are provided processes for the purification of polycarbonates wherein undesirable impurities such as titanium catalysts are removed in an aqueous solution.

Another object of the present invention resides in the purification of polycarbonates by accomplishing the formation, and removal of complexes of the impurities contained therein such as titanium butoxide catalysts.

In yet another specific object of the present invention there are provided processes for the purification of certain polycarbonates which are substantially free of impurities.

Furthermore, in yet another object of the present invention there are provided processes for the purification of polycarbonates that are useful as binders for charge transport molecules, and as binders for photogenerating pigments in layered photoconductive imaging members.

Additionally, a further object of the present invention is to provide an efficient process for obtaining purified polycarbonates with the advantages illustrated herein when selected for imaging members including low dark decay values of from about 20 to about 60 volts per second, minimum cycle down residual potential with increased cycling; and wherein there is avoided the crystallization of aryl amines selected as charge transport molecules for layered imaging members.

These and other objects of the present invention are accomplished by a process for the purification of polycarbonates. More specifically, the process of the present invention comprises the formation of complexes containing the impurities desired to be removed from the polycarbonate. In one specific embodiment, the present invention is directed to processes for the purification of polycarbonates, including polycarbonate (A), polycarbonate (Z), or copylmers thereof, by adding to a solvent a complexing component, which solvent is preferably free of acidic hydrogen; dissolving the polycarbonate in, for example, the aforementioned complex and solvent mixture, and thereafter separating therefrom the purified polycarbonate precipitate, and discarding the solution with the complexed impurities therein.

In one embodiment of the present invention, there is provided a process for the purification of polycarbonates containing titanium catalyst residues, which comprises mixing a polycarbonate with a solvent, adding to the formed solution mixture a complexing component; admixing the resulting mixture with water; and subsequently separating the polycarbonate product therefrom. Another embodiment of the present invention is directed to a process for the purification of polycarbonates containing titanium catalyst residues which comprises mixing a polycarbonate with a solvent, admixing the solution formed with a complexing component; admixing the resulting mixture with water, and subsequently separation the purified polycarbonate product therefrom. The admixing step sequence can be accomplished in any order providing the objectives of the present invention are achieved, thus for example the complexing component may be dissolved in the solvent before or after the polycarbonate. The polycarbonate solution containing the complexing component may be admixed with water by adding the solution slowly, from about 30 to about 240 minutes to add 100 milliliters of solution dropwise to the stirred water, or rapidly from about 30 seconds to about 5 minutes to add 100 milliliters. The solution can be added by means of a sparge tube below the water surface while stirring rapidly, about 300 to 1,000 stirrer rpm, or by adding the water to the stirred polycarbonate either rapidly or slowly from, example, about 2 seconds to about 3 days.

The process of the present invention in one embodiment is directed to the purification of polycarbonates which comprises dissolving, preferably by stirring a polycarbonate prepared with titanium catalysts, such as polycarbonate (A), or polycarbonate (Z), in a suitable solvent such as polar aprotic solvents including dimethylformamide, dimethylacetamide, N-methylpyrrolidone, dimethylsulfoxide, and the like; adding to the formed mixture a complexing component such as tartaric acid, which component forms a complex with the titanium impurities contained in the polycarbonate, especially the titanium butoxide catalyst; adding water; separating the purified precipitated polycarbonate by, for example, filtration; and discarding the water impurity mixture with the complexed titanium impurities therein.

In one preferred embodiment of the present invention, there is provided a process for the purification of polycarbonates, which comprises dissolving 025 gram of tartaric acid in 100 milliliters of dimethylformamide and following complete dissolution of the complexing tartaric acid, adding 10 grams of a polycarbonate or a copolymer of 90 mole percent of bisphenol (Z), and 10 mole percent of bisphenol (A) obtained from melt transesterification using titanium butoxide as catalyst. This mixture was then stirred for 16 hours during which time the copolymer dissolved. The copolymer was then precipitated by adding this solution dropwise to 3,000 milliliters of rapidly stirred deionized water. Subsequently, the precipitated copolymer was then collected by filtration and dried for 20 hours in a vacuum oven at about 100° C.

Examples of polycarbonates selected for the process of the present invention include polymers obtained from 4,4'-dihydroxydiphenyl-1,1-ethane, 4,4'-dihydroxydiphenyl-1,1-isobutane, 4,4'-dihydroxydiphenyl-2,2-propane, 4,4'-dihydroxydiphenyl-4,4-heptane, 4,4'-dihydroxydiphenyl-1,1-cyclohexane, 4,4'-dihydroxy-3,3'-dimethyldiphenyl-2,2-propane, 4,4'-dihydroxy-3,3',5,5'-tetrachlorodiphenyl-2,2-propane, 4,4'-dihydroxydiphenylsulfone, 4,4'-dihydroxydiphenylether, copolymers thereof; and the polycarbonates as illustrated in the aforementioned copending application. The structures thereof may be located in Hermann Schnell's Chemistry and Physics of Polycarbonates, Polymer Reviews V. 9, Interscience Publishers, principally the structures found in Tables IV-1, pages 86 to 90, and also Tables IV-2, V-1, V-2, V-3, V-4, V-5, and V-6, the disclosure of which is totally incorporated herein by reference.

Illustrative examples of solvents, usually present in an amount of from 10 percent to about 20 percent weight-/volume water to polymer utilized for the process of the present invention include aprotic solvents with no acid hydrogen, that is polar solvents of moderately high dielectric constants, that is for example from about 30 to about 50, such as dimethylformamide, N-methylpyrrolidone, dimethylsulfoxide, dimethylacetamide, sulfolane and the like; reference the textbook Morrison and Boyd, Organic Chemistry, 3rd Ed., page 31, the disclosure of which is totally incorporated herein by reference. The selected solvent should permit the dissolving of the polycarbonate, and also be miscible in water.

Complexing components selected for the process of the present invention and usually present in an amount of from about 0.5 percent to about 2.5 percent of polymer (wt/wt polymer) include α-hydroxy acids such as tartaric acid, citric acid and maleic acid; α-amino acids such as aspartic acid glycine, arginine and histidine; and the like. The α-hydroxy acids, primarily since they are more soluble in the polymer solvent and water, are the preferred complexing agents. Important aspects of the process of the present invention are the selection of the complexing agent and the polymer solvent.

Substantially all titanium alkoxide catalysts should be substantially completely removable with the process of the present invention such as titanium (IV) butoxide, titanium (IV) cresylate, titanium (IV) ethoxide, titanium (IV) 2-ethylhexoxide, titanium (IV) isobutoxide, titanium (IV) isopropoxide, titanium (VI) methoxide, titanium (IV) n-nonylate, titanium (IV) n-propoxide, zirconium alkoxides, and the like. Not only is a titanium complex formed with the process of the present invention, it is water soluble thus it can be readily extracted from the polymer matrix during the precipitation of the polymer in water. It is believed, although it is not desired to be limited by theory, that during the course of the polymerization the original butoxide groups bonded to the titanium in the catalyst are displaced by phenoxide groups produced during the polymerization. In the appropriate solvent α-hydroxy acids, such as tartaric acid, can replace the phenoxide groups bonded to the titanium to a sufficient extent that a water soluble complex that can be separated from the polymer is formed.

Dissolution of the polymer in the solvent usually requires from about 2 to about 24 hours, however, the rate of dissolution is dependent on a number of factors including molecular weight and the available surface area. The formation of the catalyst complex takes place during this same time period. Heating, for example, from about room temperature to about 140° C. may be employed to aid the dissolution of the polymer. Agitation of the polymer solution aids dissolution, which agitation can be affected by shaking, mechanical or magnetic stirring. The precipitation of the purified polycarbonate can be accomplished by various known methods including the addition of the formed polymer solution to the water. Generally, vigorous agitation is affected during the precipitation step.

Purified polycarbonates obtained with the process of the present invention, and preferably with a weight average molecular weight, Mw, of from about 25,000 to about 100,000 are useful as resinous binders for photogenerating pigments and charge transport molecules in layered photoresponsive imaging members as illustrated, for example, in U.S. Pat. No. 4,265,990, the disclosure of which is totally incorporated herein by reference. More specifically, these members are usually comprised of a supporting substrate, a photogenerating layer containing therein from about 85 to about 99 percent by weight of trigonal selenium, metal phthalocyanines, or metal free phthalocyanines, optionally dispersed in the purified polycarbonate resinous binder present in an amount of from about 1 to about 15 percent by weight; and a charge transport layer dispersed (50/50) in the purified polycarbonate resinous binder obtained by the process of the present invention and comprised of, for example, aryl amines of the formula as illustrated in the '990 patent, and copending application U.S. Ser. No. 851,051 (now abandoned) relating to organic photoconductive imaging members, the disclosure of which is totally incorporated herein by reference. The aforementioned photoconductive imaging members can be incorporated into numerous imaging and printing processes and apparatuses inclusive of xerographic imaging methods.

Various suitable charge transport layers can be selected for the photoconductive imaging members illustrated herein, which layer has a thickness of from about 5 microns to about 50 microns; and preferably is of a thickness of from about 10 microns to about 40 microns. In a preferred embodiment, this transport layer comprises aryl amine molecules of the following formula

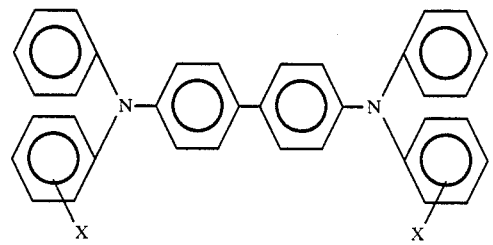

dispersed in the purified polycarbonate resinous binders obtained by the process illustrated herein, wherein X is selected from the group consisting of alkyl and halogen, such as (ortho) $CH_3$, (meta) $CH_3$, (para) $CH_3$, (ortho) Cl, (meta) Cl, and (para) Cl.

Compounds corresponding to the above formula include, for example, N,N'-diphenyl-N,N'-bis(alkylphenyl)-[1,1-biphenyl]-4,4'-diamine wherein alkyl is selected from the group consisting of methyl, ethyl, propyl, butyl, hexyl, and the like. With halo substitution, the amine is N,N'-diphenyl-N,N'-bis(halophenyl)-[1,1'-biphenyl]-4,4'-diamine wherein halo is 2-chloro, 3-chloro, or 4-chloro.

Also included within the scope of the present invention are methods of imaging with photoresponsive devices illustrated herein. These methods generally involve the formation of an electrostatic latent image on the imaging member; followed by developing the image with known developer compositions, reference for example U.S. Pat. Nos. 3,590,000; 4,469,770; 4,560,635 and 4,298,672, the disclosures of which are totally incorporated herein by reference, subsequently transferring the image to a suitable substrate, and permanently affixing the image thereto.

The invention will now be described in detail with reference to specific preferred embodiments thereof, it being understood that these examples are intended to be illustrative only. Also, this invention is not intended to be limited to the materials, conditions, or process parameters recited herein.

EXAMPLE I

In the following Examples there was selected a one liter stainless steel reactor equipped with a helical coil stirrer and double mechanical seal. The stirrer was driven by a one-half horse power motor with a 30:1 gear reduction, and a torque meter was included on the stirrer drive. The reactor was heated electrically, and the pressure was monitored by both a pressure transducer, and a pirani gauge, while the temperature was determined by a platinum RTD. A specifically designed condenser ensures the efficient condensation of phenol and diphenylcarbonate. Since some of the materials are solids at room temperature, the condenser design ensures that when they solidify they do not plug the line between the reactor and the vacuum pump which would cause the reaction to cease. In addition, at the low pressures below from 0.1 to 100 mbar at the reaction end phenol had sufficient vapor pressure at room temperature, and above that it can interfere with the polymerization by either raising the lowest pressure achievable by the system or by subliming to other parts of the condenser and plugging a line.

In this condenser, the diameter of the pipe from the reactor to the condenser was $\frac{3}{8}$ inch. The major fraction of the line consists of flexible steel piping to avoid having to exactly position both reactor and condenser. A heating mantle was used to wrap this line, and thermocouples were inserted between the mantle and the pipe to monitor the temperature. The condensation takes place in a 4 inch diameter stainless steel pipe about 7.5 inches long. The outside of the pipe was heated by a silicone rubber heating tape especially in the area where the pipe from the reactor enters. If that area is not well heated, diphenylcarbonate can plug the line in the later part of the reaction. The phenol condenses on the walls and on a spiral coil through which silicone oil at 45° C. was circulated. In this manner, the phenol drips as a liquid to the glass bottom portion of the condenser which was joined to the upper stainless steel portion by a flange employing a viton seal. This glass piece is the bottom of a 500 milliliter resin flask. Through this glass, the amount and rate of phenol condensation can be monitored. The line leaving the condenser to the vacuum pump is $\frac{1}{2}$ inch in diameter to further reduce any chance of plugging. The long extension of this line into the condenser forces the vapor down across the condensing coils and into the cool glass portion of the condenser before it can possibly exit. To avoid further migration of the phenol, a Dewar flask of dry ice and isopropanol was raised to surround the lower glass portion of the condenser when the reactor pressure was lowered below 100 mbar. The polymerization was driven by the removal of phenol, which in turn was driven by the pressure and the temperature. A series of valves, a rotary oil pump, and a surge tank provided controlled variations in reactor pressure.

There was added to the above reactor with the condensor indicated 155.5 grams of bisphenol (Z) (4,4'-cyclohexylidenediphenol) as obtained by the process as illustrated in U.S. Pat. No. 4,766,255, the disclosure of which is totally incorporated herein by reference; 138 grams of diphenylcarbonate, and 0.25 milliliter of titanium (IV) butoxide. The reactor was then sealed and heated to 220° C., and the pressure lowered from 1,000 millibar (mbar) (atmospheric pressure) to about 500 mbar. In a period of about 15 minutes, phenol began to collect in the condenser and the amount was observed through the lower glass portion of the condenser. The rate of pressure decrease was then slowed to permit about 2 hours to arrive at a pressure of 5 mbar. During the slow pressure drop, about 70 to 80 milliliters of phenol were observed to collect in the lower glass portion of the condenser. When the pressure reached about 100 mbar, a Dewar flask of isopropanol and dry ice was placed around the lower portion of the condenser to reduce the vapor pressure of the phenol. After 3 hours at 220° Celsius, the temperature was increased to 280° Celsius and heating was continued for 2 hours. Thereafter, the temperature was increased to 290° Celsius, and the molten polymer resulting was drawn from the reactor by pulling with large forceps into a dry nitrogen atmosphere to prevent hydrolysis or oxidation of the heated polymer, which after cooling had a weight average molecular weight in polystyrene equivalents of 39,000 as determined by GPC of polycarbonate (Z). Subsequently, to affect purification of the product, 10 grams of the polycarbonate were added to 100 milliliters of dimethyformamide as the polymer solvent containing 0.25 gram of tartaric acid as the complexing component. Following the stirring of the mixture for 16 hours, the resulting polymer solution was precipitated into 3 liters of rapidly stirring deionized water. The resulting purified polymer was recovered by filtration and dried overnight in a vacuum oven at about 100° Celsius.

As determined by DC plasma emission spectrophotometry, the untreated polymer contained 160 $\mu gg^{-1}$ (microgram per gram the antiquated designation for which was parts per million) of titanium and the purified polycarbonate dissolution in dimethylformamide containing tartaric acid and subsequent precipitation in water contained 1.1 $\mu gg^{-1}$ of titanium.

EXAMPLE II

The processes of Example I were repeated with the exceptions that there was selected 140 grams of bisphenol (Z) (4,4'-cyclohexylidenediphenol); 13.2 grams of bisphenol (A) (4,4'-isopropylidenediphenol); and 136.7 grams of diphenylcarbonate. Also, the temperature profile was two hours at 220° Celsius; 1.5 hours at 260° Celsius; 1 hour at 280° Celsius; and 1 hour at 300° Celsius. There resulted a polycarbonate with a GPC weight molecular weight of 67,000, which polycarbonate had a titanium content of 220 $\mu gg^{-1}$, and a titanium content of 5.6 $\mu gg^{-1}$ after purification.

EXAMPLE III

The processes of Example II were repeated with the exceptions that there was selected 280 grams of bisphenol (Z) (4,4'-cyclohexylidenediphenol); 26.4 grams of bisphenol (A) (4,4'-isopylidenediphenol); 273.4 grams of diphenylcarbonate; and 0.5 milliliters of titanium (IV) butoxide. The resulting copolycarbonate was purified as in Example II, and the titanium level was reduced to 1.8 $\mu gg^{-1}$ after purification from 198 $\mu gg^{-1}$ in the untreated polymer.

EXAMPLE IV

The processes of Example III were repeated with the exception that there was selected as the solvent dimethylacetamide in place of dimethylformamide; and substantially similar results were obtained. The purified polymer had a titanium content of 5.6 $\mu gg^{-1}$.

EXAMPLE V

The processes of Example III were repeated with the exception that there was selected as the solvent N-methylpyrolidone in place of dimethylformamide, and substantially similar results were obtained. The purified polycarbonate polymer had a titanium content of 18 $\mu gg^{-1}$.

EXAMPLE VI

The processes of Example III were repeated with the exception that there was selected as the complexing agent, citric acid in place of tartaric acid, and substantially similar results were obtained. The purified polymer had a titanium content of 10.3 $\mu gg^{-1}$.

EXAMPLE VII

The processes of Example III were repeated with the exception that there was selected as the complexing agent, malic acid in place of tartaric acid, and substantially similar results were obtained. The purified polymer had a titanium content of 6.6 $\mu gg^{-1}$.

EXAMPLE VIII

The process of Example III were repeated with the exceptions that the amount of precipitant water was decreased to 50 milliliters per gram of polymer in place of 300 milliliters per gram of polymer, a sparge tube was used for the introduction of the polymer solution, and higher agitation was used than in Example III. Substantially similar results were obtained. The purified polycarbonate polymer had a titanium content of 3.1 $\mu gg^{-1}$.

EXAMPLE IX

The processes of Example III were repeated with the exceptions that there was selected a 20 percent polymer solution in a place of a 10 percent solution, and water was added to this solution under the conditions of very high agitation in place of adding the polymer solution to water using moderately high agitation. The amount of water was also decreased to 25 milliliters per gram of polymer in place of 300 milliliters per gram of polymer, and substantially similar results were obtained. The purified polymer had a titanium content of 1.9 $\mu gg^{-1}$.

EXAMPLE X

The process of Example III was repeated with the exceptions that the aspartic acid was selected at the α-amino acid complexing agent in place of the tartaric acid, and the polymer solution was filtered prior to precipitation. Substantially similar results were obtained.

EXAMPLE XI

Photoresponsive imaging members were prepared by providing for each member a titanized Mylar substrate in a thickness of 75 microns with a layer of N-methyl-3-aminopropyltriethyloxysilane in a thickness of 0.05 micron and a DuPont 49,000 polyester adhesive layer thereon in a thickness of 0.05 micron, and depositing thereover a photogenerator layer of 2 microns consisting of 7 volume percent trigonal selenium dispersed in poly(vinylcarbazole).

Thereafter, the above photogenerating layers were overcoated with an amine charge transport layer as follows:

A transport layer consisting of 50 percent by weight of the purified polycarbonates of the present invention, and obtained by the process of Examples I to X was mixed with 50 percent by weight N,N'-diphenyl-N,N'-bis(3-methylphenyl)-1-1'-4-4'-diamine in 10 percent by weight of methylene chloride in an amber bottle. The resulting solutions were then coated in a dry thickness of 24 microns on top of each of the above photogenerating layers with a multiple clearance film applicator. The resulting members were then dried in a forced air oven at 135° C. for 20 minutes.

The photosensitivity of these 10 members was then determined by electrostatically charging the surface thereof with a corona discharge source until the surface potential, as measured by a capacitively coupled probe attached to an electrometer, 800 ($V_{DDP}$) volts was prior to exposure. The front surface of the charged member was then exposed to light from a filtered 150 watt Xenon lamp allowing light in the wavelength range of 400 to 700 nanometers to reach the member surface. The exposure causing reduction of the surface potential to half of its initial value, $E_{\frac{1}{2}}$, and the percent discharge of surface potential due to various exposure energies was then determined. The photosensitivity can be determined in terms of the exposure in ergs/cm$^2$ necessary to discharge the members from the initial surface potential to half that value. The higher the photosensitivity, the smaller the exposure energy required to discharge the layer to 50 percent of the surface potential. The cycling stability of these members was measured by monitoring $V_{DDP}$, surface potential before light exposure, $V_{BKG}$, background potential 0.25 second after 11 ergs/cm$^2$ white light exposure, and $V_{res}$, residual potential after 140 ergs/cm$^2$ white light exposure over 1,000 cycles. The smaller the change in the surface potentials (delta) $V_{DDP}$, $V_{BKG}$ and $V_{res}$ during the 1,000 cycles, the greater the cycling stability. The photosensitivity and cycling results are summarized in the following tables.

| Xerographic Parameters | Example I | Example II | Example III | Example IV | Example V |
|---|---|---|---|---|---|
| dark decay | 42 | 45 | 31 | 29 | 30 |
| $E_{\frac{1}{2}}$(ergs/cm$^2$) | 1.7 | 1.5 | 1.9 | 1.9 | 1.5 |
| % discharge at 10 ergs/cm$^2$ | 84 | 85 | 85 | 88 | 87 |
| $V_{res}$(V) | 14 | 27 | 21 | 10 | 8 |
| Δ*$V_{DDP}$(V) | 0 | 0 | −15 | −54 | −50 |
| Δ$V_{BKG}$(V) | 10 | 0 | 0 | 0 | 0 |
| Δ$V_{res}$(V) | 0 | 9 | 0 | 0 | 0 |

| Xerographic Parameters | Example VI | Example VII | Example VIII | Example IX | Example X |
|---|---|---|---|---|---|
| dark decay | 58 | 26 | 24 | 32 | 30 |
| $E_{\frac{1}{2}}$(ergs/cm$^2$) | 2.0 | 2.3 | 1.6 | 1.6 | 2.3 |
| % discharge at 10 ergs/cm$^2$ | 87 | 86 | 88 | 84 | 84 |
| $V_{res}$(V) | 16 | 19 | 24 | 27 | 25 |
| Δ*$V_{DDP}$(V) | −64 | −55 | −20 | −54 | −60 |
| Δ$V_{BKG}$(V) | 0 | 10 | 0 | 0 | 10 |
| Δ$V_{res}$(V) | 0 | 10 | 0 | −5 | 10 |

*(delta)

The characteristics of the imaging members of this example indicate that such members can be selected for the generation of developed images of excellent quality with substantially no background deposits. These imaging members may be negatively charged, for example, when the photogenerating layer is situated between the hole transport layer and the supporting substrate, or positively charged when the hole transport layer is situated between the photogenerating layer and the substrate. With negatively charged imaging members, there is selected a positively charged developer composition, that is wherein the toner composition is positively charged and contains therein a charge enhancing additive such as distearyl dimethyl ammonium methyl sulfate, reference U.S. Pat. No. 4,560,635, the disclosure of which is totally incorporated herein by reference. When the imaging member is positively charged, there is selected a negatively charged developer composition comprised of resin particles such as styrene n-butyl methacrylate copolymers, and pigment particles such as carbon black, reference for example U.S. Pat. No. 4,469,770, the disclosure of which is totally incorporated herein by reference.

Other modifications of the present invention may occur to those skilled in the art subsequent to a review of the present application, and these modifications are intended to be included within the scope of the present invention.

What is claimed is:

1. A process for the purification of polycarbonates containing titanium catalyst residues, which comprises mixing a polycarbonate with a solvent; adding to the formed solution mixture a complexing component; admixing the resulting mixture with water; and subsequently separating the polycarbonate product therefrom.

2. A process for the purification of polycarbonates containing titanium catalyst residues, which comprises mixing a polycarbonate with a solvent; admixing the solution formed with a complexing component, admixing the resulting mixture with water; and subsequently separating the purified polycarbonate product therefrom.

3. A process in accordance with claim 2 wherein separation is accomplished by filtration.

4. A process in accordance with claim 2 wherein the complexing component is tartaric acid, citric acid, malic acid, or aspartic acid.

5. A process in accordance with claim 2 wherein a titanium complex is formed.

6. A process in accordance with claim 5 wherein the complex contains titanium.

7. A process in accordance with claim 2 wherein the solvent is aprotic.

8. A process in accordance with claim 2 wherein the solvent is selected from the group consisting of dimethylformamide, dimethylacetamide, dimethylsulfoxide, N-methylpyrrolidone, and sulfolane.

9. A process in accordance with claim 2 wherein the polycarbonate is obtained from Bisphenol (Z).

10. A process in accordance with claim 2 wherein the polycarbonate is comprised of a copolymer of bisphenol (Z) and bisphenol (A).

11. A process in accordance with claim 2 wherein the complex formed remains in solution.

12. A process in accordance with claim 2 wherein the polycarbonate solution concentration is from about 1 to about 30 weight percent.

13. A process in accordance with claim 2 wherein the polycarbonate solution concentration is from about 10 to about 20 weight percent.

14. A process in accordance with claim 2 wherein the complexing component is an acid utilized in an amount of from about 0.1 to about 5 percent by weight of polycarbonate.

15. A process in accordance with claim 2 wherein the complexing component is an acid utilized in an amount of from about 0.5 to about 2.5 percent by weight of polycarbonate.

16. A process in accordance with claim 2 wherein the polycarbonate titanium content is reduced from about 150 to 400 $\mu gg^{-1}$ to about 0.5 to 20 $\mu gg^{-1}$.

17. A process in accordance with claim 2 wherein the polycarbonate has a weight average molecular weight of from about 20,000 to about 100,000.

18. A process in accordance with claim 1 wherein the complexing component is selected from the group consisting of alpha-hydroxy acids, and alpha-amino acids.

19. A process in accordance with claim 2 wherein the complexing components is selected from the group consisting of alpha-hydroxy acids, and alpha-amino acids.

20. A process for the purification of polycarbonate copolymer containing titanium catalyst residues which comprises mixing the copolymer with a solvent, adding to the formed solution mixture a complexing component, admixing the resulting mixture with water, and subsequently separating the copolymer polycarbonate product therefrom.

21. A process for the purification of copolymers of polycarbonate containing titanium catalyst residues which comprises mixing the copolymers with a solvent, admixing the solution formed with a complexing component, admixing the resulting mixture with water, and subsequently separating the purified copolycarbonate products therefrom.

* * * * *